Figure 3:
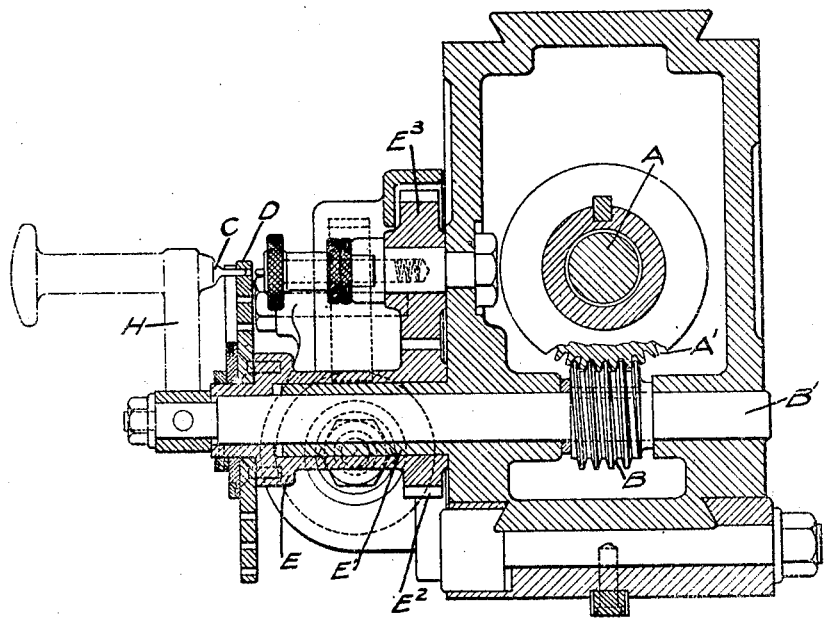

No. 851,831. PATENTED APR. 30, 1907.
J. PARKER.
INDEX HEAD.
APPLICATION FILED FEB. 5, 1904.
3 SHEETS—SHEET 1.
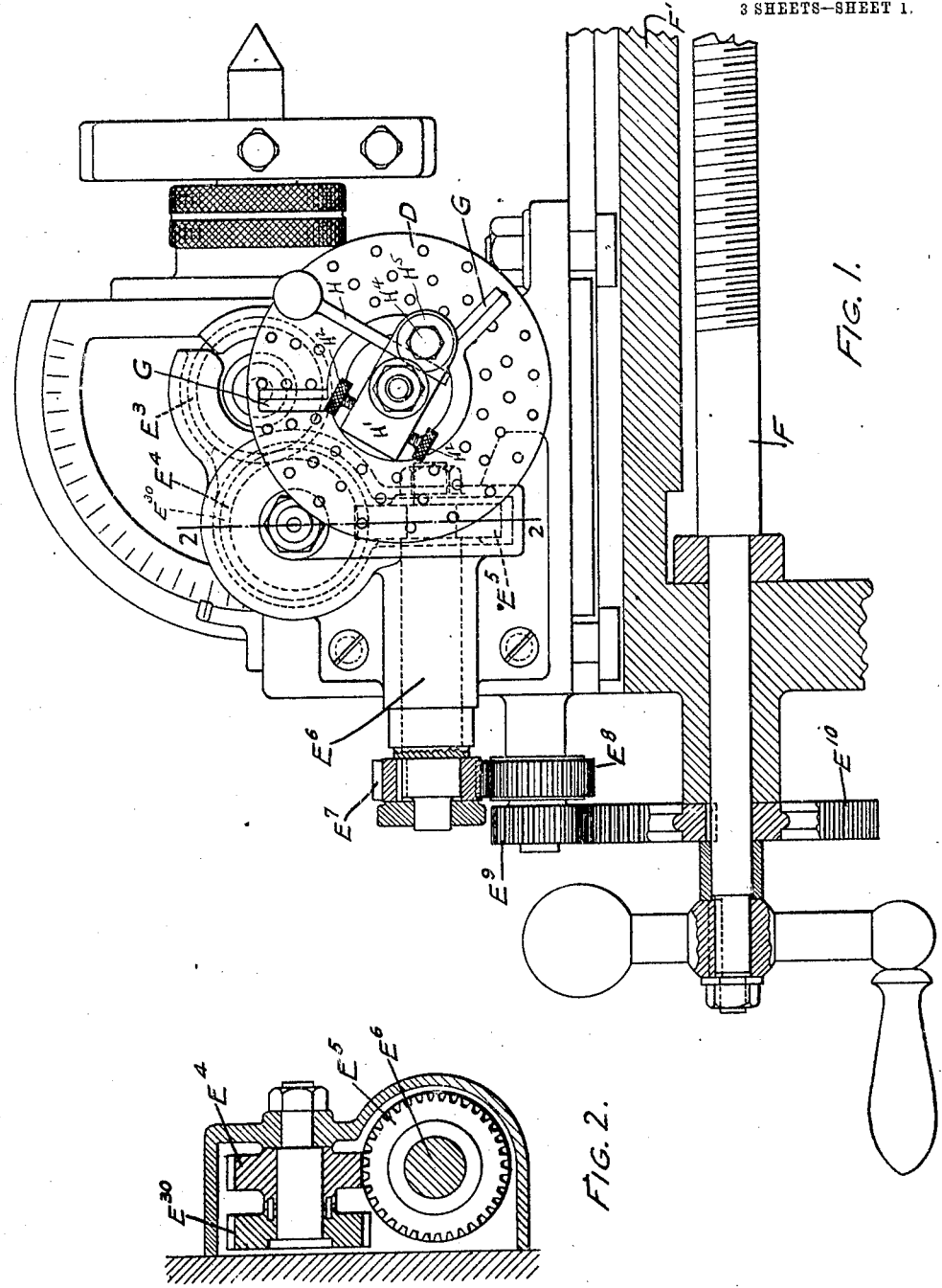
WITNESSES,
James H. Thurston
Catherine G. Bradley.
INVENTOR,
John Parker
By Wilmarth H. Thurston
ATTY.

No. 851,831. PATENTED APR. 30, 1907.
J. PARKER.
INDEX HEAD.
APPLICATION FILED FEB. 5, 1904.

3 SHEETS—SHEET 2.

WITNESSES,
James H. Thurston
Catherine G. Bradley

INVENTOR
John Parker
By Wilmarth H. Thurston
ATTY.

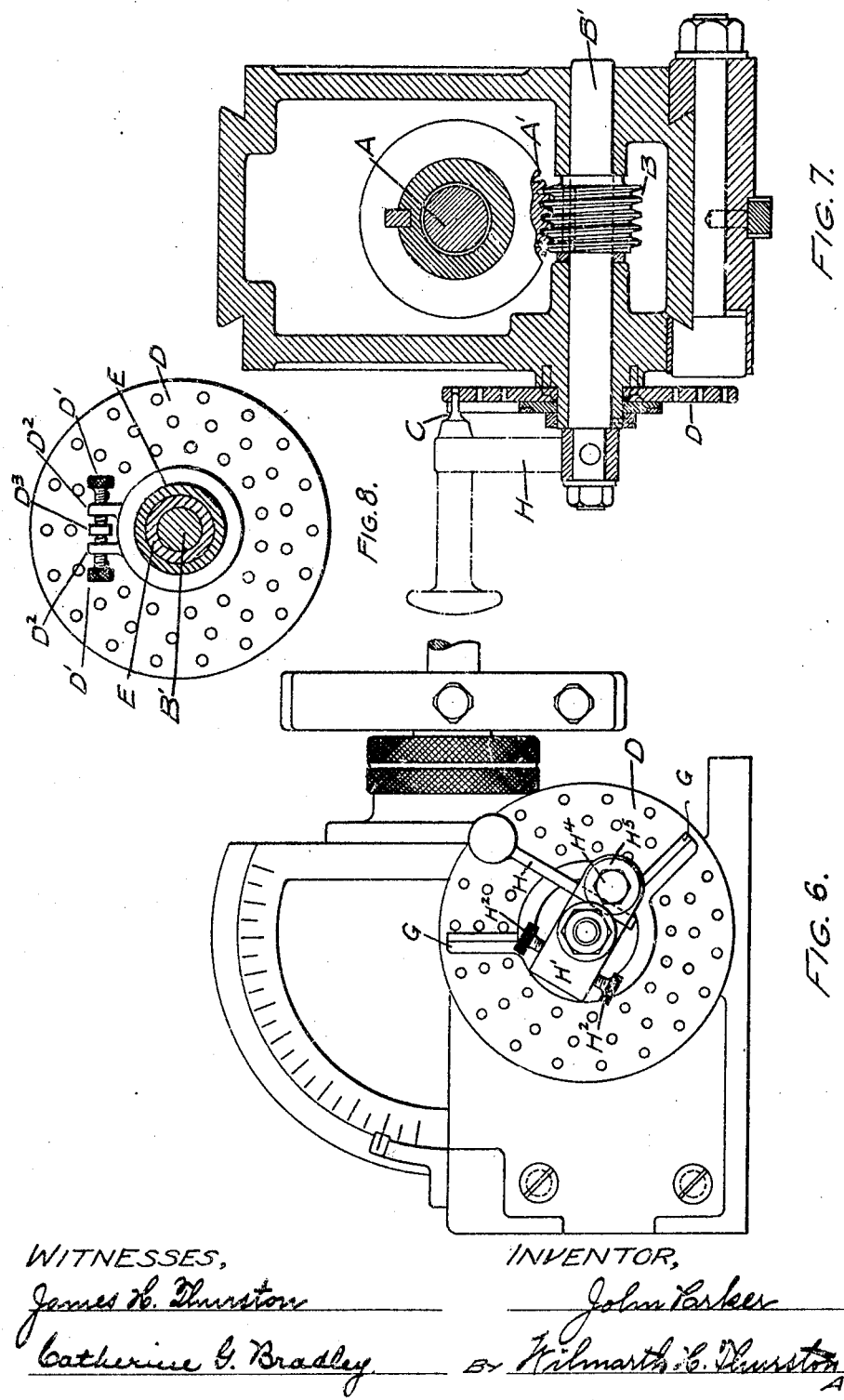

UNITED STATES PATENT OFFICE.

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

INDEX-HEAD.

No. 851,631.

Specification of Letters Patent.

Patented April 30, 1907.

Application filed February 5, 1904. Serial No. 192,231.

*To all whom it may concern:*

Be it known that I, JOHN PARKER, of the city and county of Providence and State of Rhode Island, have invented certain new and useful Improvements in Index-Heads; and I do hereby declare the following specification, taken in connection with the accompanying drawings, forming a part of the same, to be a full, clear, and exact description thereof.

The invention relates to index heads, such, for instance, as are used in milling machines for supporting and presenting the work to the milling cutters, either in making cuts extending parallel to the axis of the work or in making spiral cuts. These index heads are provided with an index plate in which are formed one or more series of circularly arranged holes which coöperate with an index pin carried in an arm secured to the index shaft which controls the angular position of the work supporting spindle. During the cutting operation the index pin engages a hole in the index plate and holds the work in a definite relation to the index plate. In case a straight cut is to be made the index plate remains stationary during the cutting, while in the case of a spiral cut the index plate is rotated in a fixed ratio to the forward movement of the work, thereby rotating the work through the connection of the index plate with the index shaft.

The work is indexed after a cut has been made by turning the index pin arm through the proper angular distance with relation to the index plate, (the index pin being withdrawn from the hole in the plate) and then inserting the index pin in the proper hole in the index plate.

It is frequently desirable to start a cut at a definite point on the work, as for instance in recutting work which has been previously cut or in replacing work which has been partially finished and removed from the work supporting spindles or centers. It usually happens in such cases that when the work has been secured in position with relation to the work supporting spindle and the index shaft adjusted to bring the work into proper angular relation to the cutter, the index pin will not be in register with the proper hole in the index plate.

The present invention relates to means by which the angular relation between the index plate and index pin may be adjusted to bring the pin and hole in the plate in exact register in case they are out of register when the work is properly positioned with relation to the cutter.

It is the object of the invention to provide means whereby this relative angular adjustment between the pin and the index plate may be accurately and conveniently effected either in index heads adapted for straight work or in index heads adapted for spiral work.

The features and combinations constituting the invention will be set forth in the claims and will be understood from the following detailed description of constructions embodying the invention and shown in the accompanying drawings.

Figure 4:
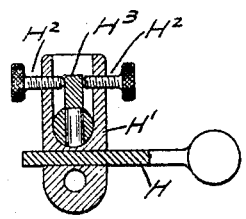
Figure 5:
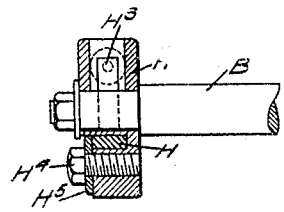

In these drawings Figure 1 is a side elevation of an index head adapted for either straight or spiral work, and so much of the feed table of a milling machine as is necessary to show the manner of connecting the index head with the feed screw of the feed table. Fig. 2 is a detail section on line 2—2 Fig. 1. Fig. 3 is a transverse vertical section through the axis of the index shaft. Figs. 4 and 5 are details of the devices for connecting the index pin arm to the index shaft. Fig. 6 is a side elevation of an index head adapted for straight work only. Fig. 7 is a vertical transverse section through the axis of the index shaft in Fig. 6. Fig. 8 is a detail showing a modified form of means for effecting the relative angular adjustment between the index plate and the index pin arm.

The construction of the index heads shown in the drawings is the same as the construction of such heads heretofore in use, except as to the relative adjustment between the index pin and index plate. Each of these index heads is provided with a spindle A adapted to support the work in the usual manner and provided with a worm wheel A' which is engaged by a worm B secured to an index shaft B'. In each head the spindle is indexed by turning the shaft B' through the proper angular distance and is held in fixed relation to the index plate D after being indexed by the engagement of an index pin C with one of the holes in the plate.

In the form of head shown in Figs. 1 and 3 the index plate D is secured to a sleeve E which is mounted on a hub E' and is provided with a gear $E^2$. The gear $E^2$ is engaged by a gear $E^3$ driven from a gear $E^{30}$ secured to a spiral gear $E^4$ which is in turn engaged and driven by a spiral gear $E^5$ secured to a shaft $E^6$. A gear $E^7$ is removably secured to the end of the shaft $E^6$ and is engaged by a gear $E^8$ which is secured to a gear $E^9$. The gear $E^9$ is engaged and driven by a gear $E^{10}$ secured to the feed screw F which moves the feed table F' on which the index head is secured. By the train of gearing just described the index plate D will be rotated as the feed table F' is fed forward by the rotation of the screw F, and through the connection between the index plate and the index shaft B' the shaft B' will be turned to rotate the spindle A in a definite ratio to the advance movement of the feed table. After a cut has been made the work is indexed by removing the index pin C from the hole in the index plate and turning the index shaft through the proper angular distance and then engaging the index pin with the proper hole in the index plate. The index plate is provided with the usual sector arms G for indicating the hole into which the index pin should be inserted after the indexing has been performed.

As thus far described the construction and mode of operation of the index head is similar to index heads heretofore in use.

In order to enable the index pin to be brought into register with the proper hole in the index plate in case the index pin is not in proper register with such hole after the work has been adjusted into the desired angular relation to the cutter, the arm H which carries the index pin C is so connected with the shaft B' that its angular relation to the shaft may be varied. By varying the angular relation of the index pin arm H with the index shaft, the index pin may be adjusted with relation to the index plate to bring the pin into register with the proper hole without affecting the position of the work with relation to the cutter. Instead of first positioning the work and then bringing the pin and hole into register, the pin may be first inserted in the hole in the index plate and then the index shaft adjusted relatively to the arm H to bring the work into exact position. The means which is preferably employed for thus connecting the index pin arm and index shaft is best shown in Figs. 4 and 5. As here shown the arm H is carried in a block H' loosely mounted on the end of the shaft B'. The block H' is held in angular position upon the shaft B' by means of two adjusting screws $H^2$ which engage opposite sides of a stud $H^3$ projecting from the shaft B'. The block H' is recessed about the stud $H^3$ so that the angular position of the block upon the shaft may be varied by adjusting the screws $H^2$. After the block has been adjusted it is held rigidly in position upon the shaft by the engagement of the adjusting screws with the opposite sides of the stud $H^3$. The arm H is so mounted in the block H' that it may be adjusted radially of the index plate to bring the index pin into register with any one of the series of holes in the index plate. When adjusted the arm is clamped in position in the block H' by a bolt $H^4$ and clamping plate $H^5$.

Instead of adjusting the index pin angularly with relation to the index plate, the relative adjustment between the plate and index pin may be affected by an adjustment of the index plate with relation to the sleeve E by which it is turned in cutting spirals. In Fig. 8 one form of means for effecting such adjustment is shown. In this construction the devices employed for adjusting the index plate consist of two adjusting screws D' threaded in lugs $D^2$ on the sleeve E and engaging opposite sides of a lug $D^3$ projecting from the plate D. By turning these screws the plate may be adjusted angularly with relation to the indexing pin without affecting the relation between the work spindle and the sleeve E, after the work has been properly positioned with relation to the cutter for the purpose of bringing the pin and proper index hole into register.

In the head shown in Figs. 6 and 7 the index plate is secured in fixed position upon the head, and the angular adjustment between the index finger and the index plate is affected by adjusting the index pin arm H about the shaft B' by the same devices already described in connection with Figs. 4 and 5.

The relative angular adjustments above described not only enable the work to be accurately positioned in any definite relation to the cutter in replacing work already cut or partially cut, but they also enable a fine adjustment of the work after it has been accurately positioned and the index pin inserted in the proper hole in the index plate. Suppose for instance the work has been positioned and the index pin inserted in the proper hole, and it is desired to make a fine adjustment between the work and cutter, this may be done by adjusting the shaft B' in relation to the arm H in the construction shown in Figs. 1 to 7 or by adjusting the plate D in relation to the sleeve E in the construction shown in Fig. 8. In either case the work spindle will be turned without disturbing the relation between the parts of the indexing devices and consequently the successive cuts will be properly spaced by said devices.

What I claim as my invention and desire to secure by Letters Patent is:

1. In an index head the combination, with the index plate and the rotatable index member, of a block angularly adjustable about the member, and an index pin arm radially adjustable in said block, substantially as described.

2. In an index head the combination, with the index plate and the rotatable index member, of an index pin arm, a block carrying the arm, adjusting screws in the block, and a stud projecting from said member between the screws, substantially as described.

JOHN PARKER.

Witnesses:
W. H. THURSTON,
J. H. THURSTON.